Patented Nov. 28, 1922.

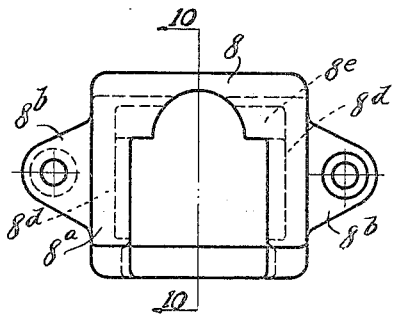
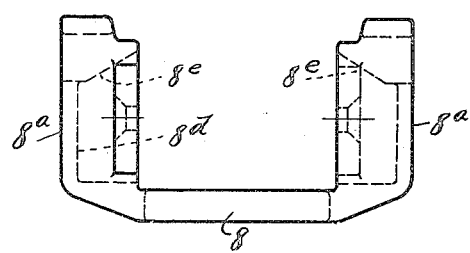
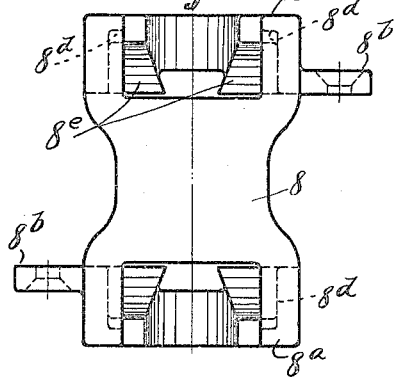
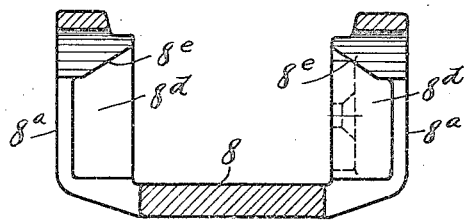
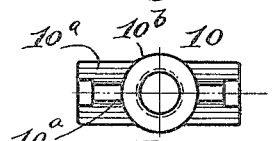
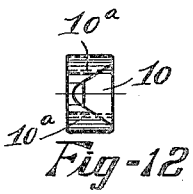
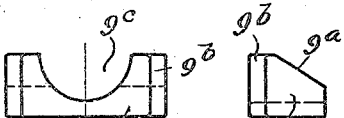
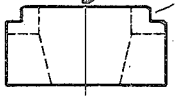
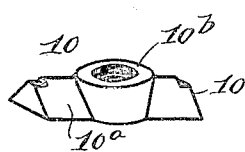
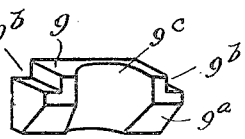

1,436,713

UNITED STATES PATENT OFFICE.

WILLIAM L. HINGER, OF CLEVELAND, OHIO, ASSIGNOR TO UZOLD TIRE CORPORATION, OF CLEVELAND, OHIO, A CORPORATION OF DELAWARE.

TIRE PROTECTOR.

Application filed December 18, 1919, Serial No. 345,742. Renewed April 18, 1922. Serial No. 555,233.

*To all whom it may concern:*

Be it known that I, WILLIAM L. HINGER, a citizen of the United States, residing at Cleveland, in the county of Cuyahoga and State of Ohio, have invented certain new and useful Improvements in Tire Protectors, of which the following is a specification.

My invention relates to improvements in tire protectors, and more particularly to protective devices for pneumatic tires embodying a tire protective casing together with improved means for securing and adjusting said protective casing.

The primary object of the invention is to provide a generally improved protective device for pneumatic tires which will be exceedingly simple in construction, cheap of manufacture and efficient in use.

The improved protective device comprises a protective casing preferably made up of a plurality of abutting sections cut from old or used tire casing adapted to be readily attached to or detached from any ordinary pneumatic tire casing or shoe for the purpose of protecting the latter, as well as extending its wear and mileage, the invention being particularly designed and adapted for utilizing old or used tire casing.

More specifically speaking, my invention relates to improved means for independently securing and adjusting such protective casing sections, such means preferably comprising a plurality of supplemental radially movable spaced tire carrying members or split rims adapted to detachably secure the protective casing and adjust the same through the medium of improved relatively fixed and movable clamp members adapted to be readily attached to and detached from any ordinary wheel felly.

A further and very important object of the invention is the provision of improved demountable clamp or shackle members which may not only be attached to any ordinary wheel felly, but the provision of improved relatively movable clamp members which may be readily attached to the supplemental split or sectional rims, together with improved attaching bolts and bolt actuated members interposed between the relatively fixed and movable shackle or clamp members and adapted to move said movable shackle members and rims for moving the latter toward the wheel center and thereby effectually drawing up and adjusting the protective casing without the use of supplemental tools.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
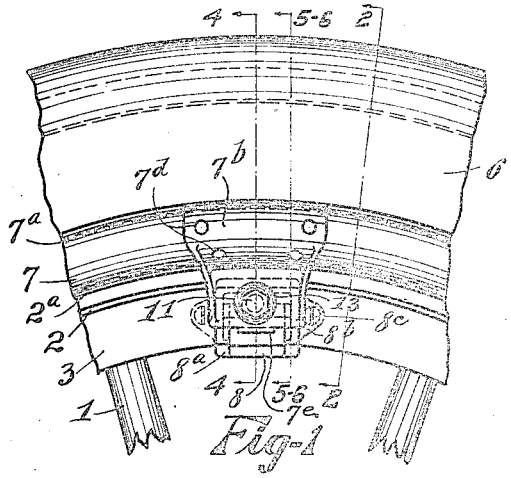

Referring to the accompanying drawings, forming a part of this specification, Figure 1, is a fragmentary side elevation of a wheel felly and pneumatic tire equipped with a tire protective casing and supplemental casing securing rim and adjusting devices.

Figure 2:
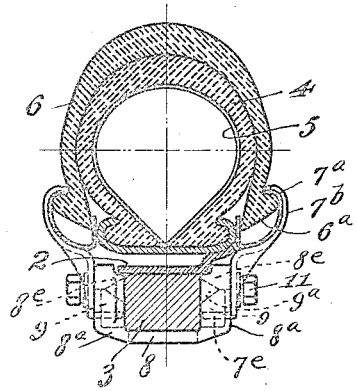

Fig. 2, a cross sectional view taken on line 2—2 of Fig. 1.

Figure 3:
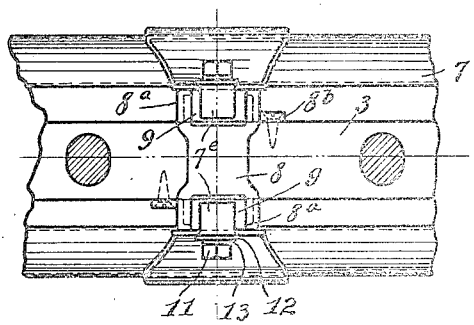

Fig. 3, a fragmentary plan view of the inner or under side of the wheel felly portion and attachments connected thereto.

Figure 4:
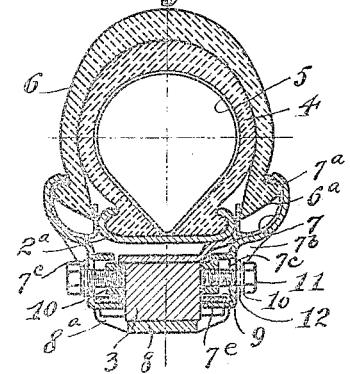

Fig. 4, a cross sectional view taken on line 4—4 of Fig. 1.

Figure 5:
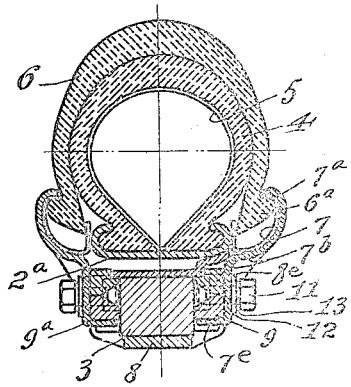

Fig. 5, a cross sectional view taken on line 5—5 of Fig. 1.

Figure 6:
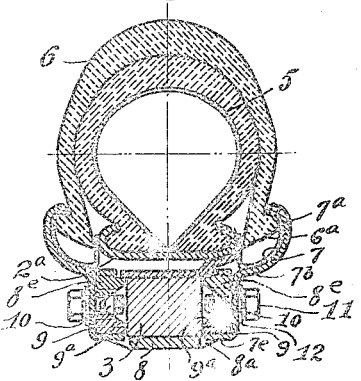

Fig. 6, a cross sectional view, taken on substantially the same plane, and showing the protective casing and supplemental rim, and rim adjusting devices and movable clamp members in their adjusted or drawn up positions.

Fig. 7, an enlarged end elevation of one of the relatively fixed clamp or shackle members detached from the wheel felly, the movable shackle member and movable shackle actuating device and actuating and adjusting bolt being removed, for the purpose of clearer illustration of the parts.

Fig. 8, a side elevation of the same.

Fig. 9, a plan view of the under side of the same.

Fig. 10, a central longitudinal sectional view of the same, taken on line 10—10, of Fig. 7.

Fig. 11, a side elevation of the movable shackle actuating members or wedge blocks, detached.

Fig. 12, an end or edge view of the same.

Fig. 13, a top plan view of the same.

Fig. 14, a side elevation of the movable shackle members, detached.

Fig. 15, an end or edge view of the same.

Fig. 16, a top plan view of the same.

Fig. 17, a perspective view of the wedge shaped bolt actuated member shown in Figs. 11, 12 and 13, of the drawings, and interposed between the inclined portions of the relatively fixed and movable shackle members for actuating the latter.

Fig. 18, a perspective view of the movable shackle member shown in Figs. 14, 15 and 16.

Similar numerals of reference designate like parts throughout all the figures of the drawings.

The wheel 1, rim 2, and felly 3, may be of any suitable and convenient form, and so likewise the main casing 4, and the inner tube 5. In the present instance, the demountable rim 2$^a$, and casing or shoe 4, are of the clencher type.

The protective casing 6, preferably comprises suitable abutting casings cut into suitable lengths from old or used tires, and forming no part of the present invention they need not be described in detail.

As a means of securing and adjusting the protective casing 6, supplemental split or sectional rims 7, are provided, said rims, in the present instance, being of channel shape and provided with hooked portions 7$^a$, adapted to receive and engage the heel portions 6$^a$, of the casing 6.

As a means of conveniently supporting and adjusting the supplemental rims 7, the latter are provided with supporting lugs or brackets 7$^b$, said brackets being provided with openings 7$^c$, and being secured to the rims 7, in any suitable and convenient manner, as per example,—by means of rivets 7$^d$.

As a means of radially moving the rim sections 7, toward and from the wheel center in the act of drawing up or loosening the protective casing 6, the wheel felly 3, is provided with a plurality of relatively fixed and movable shackle members arranged at suitable intervals, the relatively fixed shackle members 8, being provided with suitable recesses adapted to receive and contain the wheel felly 3, terminating at their sides or ends in guide heads 8$^a$.

As a means of preventing relative movements of the fixed shackle member 8, on the wheel felly, the shackle members 8, may be provided with brackets 8$^b$, adapted to be attached to the opposite sides of the wheel felly by means of attaching elements 8$^c$, such as screws, as shown.

The guides or heads 8$^a$, are provided with under cut guide ways 8$^d$, terminating in inclined abutments 8$^e$.

The movable shackle or clamp members 9, are slidably mounted in the guide ways 8$^d$, of the guides or heads 8$^a$, and are provided with opposed similarly inclined portions or abutments 9$^a$, the sides of said movable shackle members 9, being provided with guide ways or recesses 9$^b$, as shown most clearly in Figs. 16 and 18, of the drawings, and being preferably provided with central recesses 9$^c$, to receive and contain the threaded head or central boss members of the movable shackle actuating members or wedge blocks hereinafter described.

As a means of connecting the movable shackle or clamp members 9, to the split rims 7, the rim supporting members or brackets 7$^b$, are preferably provided with turned over portions or lugs 7$^e$, resting on the inner sides of the movable members 9, so that as the latter are moved radially towards the wheel center by the mechanism hereinafter described the brackets 7$^b$, and rims 7, carried thereby will be correspondingly moved.

As a means of moving the movable shackle or clamp members 9, inwardly to correspondingly move the rims 7, and tighten the protective casing, laterally movable bolt actuated members 10, are provided, said members 10, being interposed between the inclined portions 8$^e$, and 9$^a$, of the fixed and movable blocks 8, and 9, said members 10, being preferably of wedge shape with inclined portions 10$^a$, inclined at a similar angle to the inclined portions 8$^e$ and 9$^a$, so as to fit with and cooperate with the latter.

As a means of adjusting the movable shackle actuating members or wedge blocks 10, and particularly as a means of drawing the latter outwardly and thereby causing such blocks 10, and the movable clamp members 9, to be moved radially or toward the wheel center, the movable blocks 10, are provided with threaded boss portions 10$^b$, adapted to removably receive and contain adjusting clamp bolts 11, said bolts 11, extending outwardly through the openings 7$^c$, in the rim supporting members or brackets 7$^b$, and being provided with heads whereby such bolts may be readily adjusted. The openings 7$^c$, in the members 7$^b$, are preferably of considerably larger diameter than the shank portions of the bolts 11, so as to permit of the requisite radial and circumferential movements of the rims 7, in the adjusting movements as well as in actual service, and in the latter connection it will be observed that the inwardly extending lugs or tongues 7$^e$, of the brackets 7$^b$, are loosely mounted on the movable shackle members 9, so that the latter have a direct connection with the rims in an inner direction only when actuated by the actuating members 10 and 11, and thereby relieving the bolts 11, and movable members 9, of shocks and stresses by slight movements inwardly of the rims 7, by the concussions of the tire and protective casing incident to meeting an absorbing obstruction on the roadway.

The bolts 11, are preferably provided with washers 12, and lock washers 13, as shown.

From the foregoing description, taken in connection with the accompanying drawings, the operation and advantages of my invention will be readily understood.

Having thus described one of the embodiments of my invention, without having attempted to set forth all the forms in which it may be made or all the modes of its use, what I claim and desire to secure by Letters Patent, is:—

1. In a pneumatic tire, a tire protective casing, a wheel felly, split casing securing rims, relatively fixed and movable clamp members carried by said wheel felly and rims, respectively, and adjusting members between said fixed and movable clamp members for adjustably connecting and moving said casing securing rims.

2. In a pneumatic tire, a wheel felly, relatively fixed felly clamp members provided with guides, movable clamp members in the latter carrying tire heel engaging rims, and clamping and adjusting devices between said fixed and movable clamp members whereby said parts are moved relatively for adjusting said tire engaging rims.

3. In an attaching device for tire protectors, supplemental split rims adapted to engage a protective casing, relatively fixed shackle members adapted to engage a wheel felly and provided with guide heads having inclined undercut abutments, movable shackle members having oppositely inclined portions, and adjusting bolts carrying bolt actuated movable wedge members between the inclined portions of said fixed and movable shackle members.

4. In a tire attaching device, a wheel felly, relatively fixed felly clamp members provided with guide heads terminating in inclined abutments, movable clamp members in said guide heads having inclined portions opposite said inclined abutments, tire casing engaging rims carried by said movable clamp members, and clamping and adjusting wedge members between the inclined portions of said fixed and movable clamp members whereby said movable clamp members and rims are moved relatively for adjusting the latter.

5. In an attaching device for pneumatic tires, a protective casing, a wheel felly, tire casing securing rims, relatively fixed and movable shackle members carried by said wheel felly, said movable shackle members being detachably connected to said tire casing securing rims, and adjustable attaching bolts secured to said rims and provided with laterally movable members between said fixed and movable shackle members and adapted to move the latter and said rims toward the wheel center as drawn up.

6. In a tire attaching device, a wheel felly, felly engaging shackle members provided with side guides terminating in inclined abutments, casing securing rims provided with supporting members at the sides of the latter, relatively movable shackle members in said guides and engaging said rim supporting members, laterally movable wedge members between said fixed and movable shackle members, and wedge adjusting bolts connected to said rim supporting members and said wedge members whereby the latter and said movable shackle members and rims and protective casing are moved toward the wheel center.

7. In an attaching device for tires, a wheel felly provided with a tire, sectional tire securing rims, fixed and movable clamp members, said fixed clamp members being mounted on said wheel felly and provided with guides terminating in inwardly inclined abutments and said movable clamp members being connected to said rims and mounted in said guides and having opposed oppositely inclined abutments, laterally movable wedge members having similarly inclined sides interposed between the inclined abutments of said fixed and movable clamp members, and screw bolts for actuating said laterally movable wedge members whereby said movable clamps are moved away from said fixed abutments of said fixed clamp members.

8. In a tire attaching device, a wheel felly, felly engaging shackle members provided with side heads having undercut guide ways terminating in downwardly inclined abutments, casing securing rims provided with supporting members at the sides of the latter, relatively movable shackle members in said guides provided with oppositely inclined portions opposite said abutments and engaging said rim supporting members, movable wedge members between said abutments and inclined portions of said fixed and movable shackle members, and wedge adjusting elements connected to said rim supporting members and said wedge members whereby the latter and said movable shackle members and rims and protective casing are moved toward the wheel center.

9. In an attaching device for pneumatic tires, a wheel felly, felly engaging shackle members provided with side guides terminating in relatively fixed abutments, movable shackle members in said guides and provided with inclined bearing portions opposite said fixed abutments, laterally movable wedge members interposed between said fixed abutments and inclined bearing portions, tire securing rims on opposite sides of said guides and provided with rim supporting lugs, and clamping bolts extending through the latter and connected to and adapted to actuate said laterally movable wedge members whereby the latter are adapted to move said movable shackle members and rim carrying lugs away from said relatively fixed abutments and toward the wheel center.

10. In an attaching device for pneumatic tires, a wheel felly, felly engaging shackle members provided with side guides terminating in relatively fixed laterally inclined abutments, movable shackle members having similarly inclined oppositely extending abutments in said guides, laterally movable members having similarly inclined faces interposed between said fixed and movable abutments, tire securing rims on opposite sides of said guides, rim supporting lugs at the sides of said guides and provided with enlarged openings, and clamping bolts loosely extending through the latter and connected to and actuating said laterally movable wedge members whereby the latter moves said movable shackle members and rim carrying lugs away from said relatively fixed abutments and toward the wheel center.

In testimony whereof I have affixed my signature.

WILLIAM L. HINGER.